United States Patent [19]

Wikdahl

[11] Patent Number: 4,479,872
[45] Date of Patent: Oct. 30, 1984

[54] METHOD AND APPARATUS IN SCREENING FIBER SUSPENSIONS

[76] Inventor: Nils A. L. Wikdahl, Bravallavagen 42, S-182 64 Djursholm, Sweden

[21] Appl. No.: 537,452
[22] PCT Filed: Dec. 14, 1982
[86] PCT No.: PCT/SE82/00427
§ 371 Date: Sep. 7, 1983
§ 102(e) Date: Sep. 7, 1983
[87] PCT Pub. No.: WO83/02470
PCT Pub. Date: Jul. 21, 1983

[30] Foreign Application Priority Data

Jan. 8, 1982 [SE] Sweden ................... 8200073

[51] Int. Cl.³ .............................. B03B 5/56
[52] U.S. Cl. ...................... 209/258; 209/273
[58] Field of Search ............... 209/258, 268, 273

[56] References Cited

U.S. PATENT DOCUMENTS 3,410,409 11/1968 Rittenhouse et al. ............ 209/273
4,042,503 8/1977 Justus ........................... 209/273
4,126,542 11/1978 Carlsmith ....................... 209/258

FOREIGN PATENT DOCUMENTS 2459587 10/1975 Fed. Rep. of Germany ...... 209/273
1507951 11/1967 France .

*Primary Examiner*—Tim Miles

[57] ABSTRACT

Method and apparatus in screening a fiber suspension in a pressure screen (10) with an inlet (1) for the fiber suspension and outlets (2, 3) for accept and reject, respectively, a conduit (12, 13) being respectively connected to said outlets, the reject conduit (13) opening to the atmosphere at its end facing away from the reject outlet and being at least partially at a higher level than both inlet (1) and reject outlet (3), the flow through said conduit (13) being measured, the difference between the measured value and a criterion value being determined, and the flow through the reject conduit (13) being changed in response to a function of the difference of the change of the flow through the accept conduit (12) by means of a valve (7) in said accept conduit (12).

10 Claims, 1 Drawing Figure

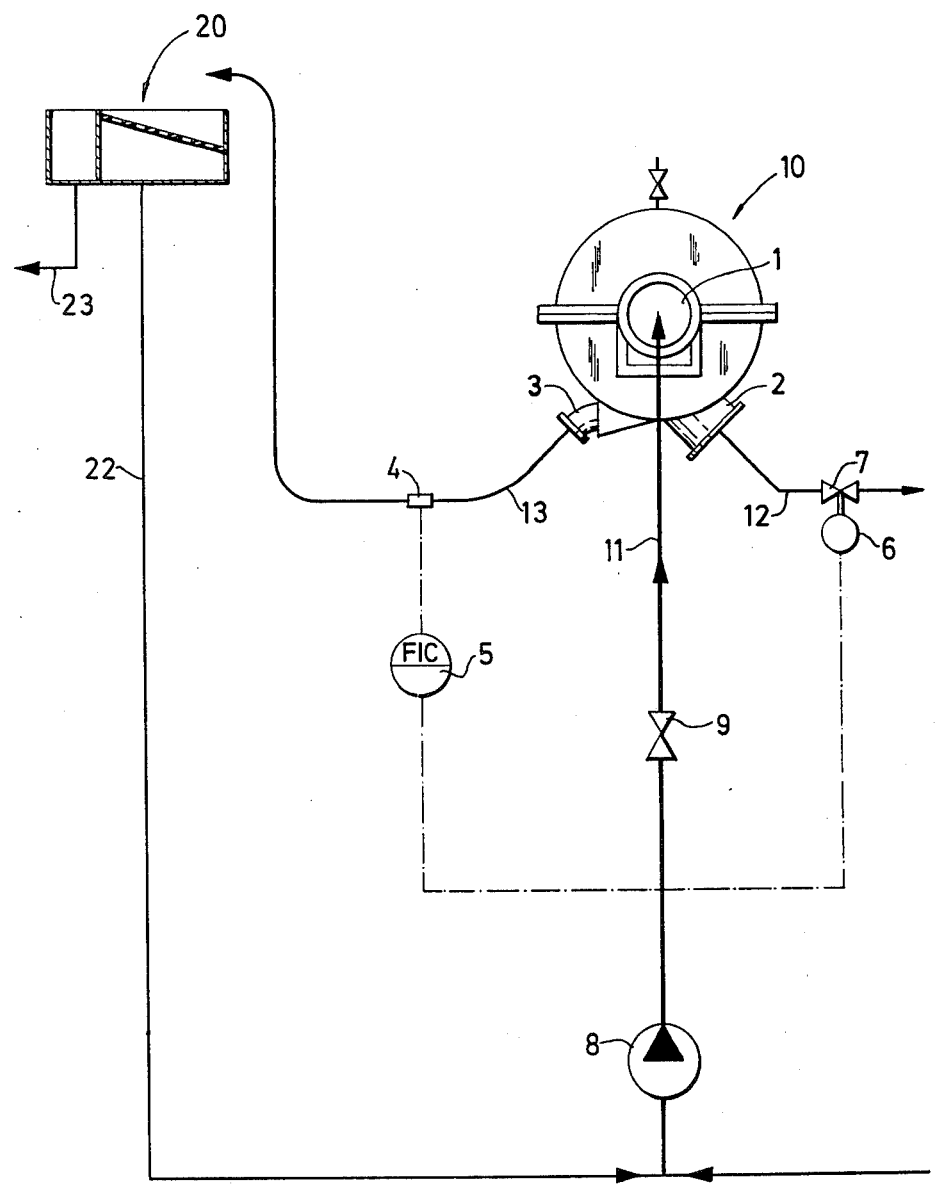

METHOD AND APPARATUS IN SCREENING FIBER SUSPENSIONS

The present invention relates to a method in screening fibre suspensions, preferably for removing coarse rejects in a pressure screen, and an apparatus for carrying out the method.

In producing fibre suspensions for pulp and/or paper manufacture, undesirable coarser particles such as splinters, pieces of wood, twigs, and larger bunches of fibres are obtained as a result of the imperfection of the production process. Furthermore, other extraneous matter (pollutants) may be present, e.g. plastics, wire and the like which accompany the raw material. The latter is particularly applicable when using waste paper as starting material. These pullutants must be removed from the system at an early stage in order to avoid operational disturbances caused by them in later stages of processing the fibre suspension, e.g. when cleaning in hydrocyclone separators or vortex cleaners and fine screening. The most usual method earlier of separating these pollutants was screening in an open screen.

It is now, however, a desire to use entirely closed systems to as large an extent as possible, particularly for the main flow line. In using a pressure screen as a coarse screen, the entering coarse particles must not lead to operational interruptions, e.g. because these larger pieces rejected in the coarse screen fasten in the reject conduit and block it.

The object of the present invention is to provide a method in coarse screening with a pessure screen in which blocking (plugging) of the screen reject conduit and reject outlet is prevented, and also an apparatus for carrying out the method.

This object is achieved in accordance with the invention by a special implementation of the reject conduit and by regulating the flow through the reject conduit by affecting the flow in the accept conduit.

The reject conduit is given an orientation in space such that in operation the upper level of the reject is higher then the level of the screen inlet. In its end facing away from the screen the reject conduit is open to the atmosphere. Accordingly, the pressure in the reject outlet depends on the reject level in the conduit, which has a diameter and a radius of curvature in the zone of direction change sufficiently large that no objects, especially elongate objects, e.g. twigs can fasten. The reject conduit is preferably a pipe without a valve and other means, which affect the inside diameter of the pipe or its cross-sectional area and can form flow obstructions on which the reject can fasten.

There is a flowmeter for controlling the flow through the reject conduit, preferably a magnetic flowmeter, which is arranged in the reject conduit. When the reject flow deviates from a criterion value, which may be predetermined and constant or a function, e.g. of the flow through the inject conduit or the fibre content of the incoming suspension, the flow through the reject conduit is changed to come into line with the criterion value. This is accomplished by actuation of a valve in the accept conduit, since the reject conduit lacks flow regulating means, and a change of the accept flow automatically leads to change flow in the reject conduit.

The invention will now be described by means of a nonrestricting embodiment and with the aid of the drawing, the sole figure of which schematically illustrates a screen with associated conduits and control means.

The screen 10 shown in the Figure is a pressure screen described in the Swedich Patent Specification No. 343 621, and has stationary screening means and rotating blades or foils. A fibre suspension coming from a non-illustrated fibre source, e.g. a blow tank, is supplied to the inlet 1 of the screen 10 via a conduit 11 and a pump 8 arranged therein. The incoming suspension is divided into an accepted and a rejected fraction in the screen 10, which leave the screen 10 through outlets 2 and 3, respectively. The rejected fraction or reject contains prime fibres as well as coarse particles and is taken via a conduit 13 to an open screen 20, which is at a higher level than the screen 10. In the open screen 20 the rejected fraction supplied from the pressure screen 10 is divided into a second accept and a second reject. The second reject leaves the screen 20 via a conduit 23 e.g. for being recirculated to a digester for reprocessing. The second accept leaves the screen 20 via the conduit 22 and is taken into the conduit 11 before the pump 8 for coarse screening in the pressure screen 10.

At one end, the reject conduit 13 is open to the atmosphere. Thus, the counterpressure acting at the reject outlet is solely dependent on the hydrostatic pressure of the reject in the conduit 13, which may be set at a desired magnitude in a manner known per se. So that no large particles can fasten in the conduit 13 it must not contain valves or other flow-disturbing means which can give rise to particles being obstructed in their advance. Accordingly, the conduit 13 must have a large radius of curvature in the zone of direction change. Furthermore, it must have a cross-sectional area such that all rejected particles can pass.

The accept from the pressure screen 10 is taken from the outlet 2 via the conduit 12 to a subsequent processing step not more closely described here. A regulatable valve 7 is provided in the accept conduit 12 for controlling the screening.

The flow to the screen 10 is controlled by unillustrated means regulating the pump 8 and/or the valve 9. The reject flow in the conduit 13 is preferably measured by a magnetic flow meter 4. A signal proportional to the flow is taken to a control means 5. In this the signal from the flow meter is compared with the magnitude of a criterion value signal. The magnitude of this criterion value signal can either be preset or be a function of some property e.g. of the suspension through the conduit 11. When there is a difference between the magnitude of the signal coming from the control means 5 and the criterion value signal the control means sends a signal proportional to the magnitude of the difference, this signal actuating the control means 6 of the valve 7. The flow through the accept conduit 12 is changed by this actuation, and thereby the flow through the reject conduit 13 also, the flow through the latter conduit being changed towards the criterion value.

In the illustrated embodiment conduits and connections for dilution water as well as control means for regulating the dilution water and inject flow have been excluded for the sake of greater clarity.

The invention is not restricted to the structure of the illustrated screen, and other screens with rotating screening means can also be used, as well as screens in which the reject outlet is horisontal or upwardly directed and placed in the upper portion of the screen.

I claim:

1. A method in screening a fibre suspension in a pressure screen with an inlet for the fibre suspension and outlets for accept and reject, conduit being connected to each outlet, characterized in that the flow through the reject conduit is measured and the difference between the measured value and a criterion value is determined, the flow through the reject conduit being changed in response to a function of the difference by changing the flow through the accept conduit.

2. Method as claimed in claim 1, characterized in that counterpressure in the reject conduit is provided by means of hydrostatic pressure.

3. Method as claimed in claim 1 or 2, characterized in that the flow is measured with a magnetic flow meter.

4. Method as claimed in any of claims 1–3, characterized in that measurement takes place continuously.

5. Apparatus in screening a fibre suspension in a pressure screen (10) with an inlet (1) for the fibre suspension and outlets (2 and 3) for accept and reject, respectively, a conduit (12, 13) being respectively connected to said outlets (2, 3), characterized by comprising a valve (7) arranged in the accept conduit (12), a flow meter (4) arranged in the reject conduit (13) and control means (5, 6) adapted for receiving a signal from the flow meter (4) comparing the signal with a criterion value signal and, if there is a difference, actuating by means of a signal the valve (7), said valve (7) changing the flow through the reject conduit (13) towards the criterion value by means of changing the flow in the accept conduit (12).

6. Apparatus as claimed in claim 5, characterized in that the reject conduit (13) of the screen (10) opens out to the atmosphere at its end facing away from the reject outlet (3), and that the reject conduit (13) is, at least partially, at a higher level than both the inlet (1) and the reject outlet (3).

7. Apparatus as claimed in claim 5 or 6, the outlet (3) for reject being downwardly directed, characterized in that the reject conduit (13) is downwardly directed in the direction of flow of the reject from the reject outlet (3), subsequently going over into an upward direction.

8. Apparatus as claimed in any of claims 5–7, characterized in that the reject conduit (13) in zones of direction change has a relatively large radius of curvature.

9. Apparatus as claimed in any of claims 5–8, characterized in that the flow meter (4) is a magnetic flow meter.

10. Apparatus as claimed in any of claims 5–9, characterized in that the screen (10) has at least one stationary screening member and one rotating blade or foil.

* * * * *